United States Patent
Henderson et al.

(10) Patent No.: US 10,862,535 B2
(45) Date of Patent: Dec. 8, 2020

(54) METHODS, SYSTEMS, AND DEVICES FOR COUPLING A MODULATED VOLTAGE SIGNAL TO A CURRENT LOOP USING A VARIABLE IMPEDANCE BRIDGE

(71) Applicant: General Electric Company, Schenectady, NY (US)

(72) Inventors: Bruce Henderson, Daleville, VA (US); Alan Carroll Lovell, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 812 days.

(21) Appl. No.: 15/507,398

(22) PCT Filed: Aug. 28, 2014

(86) PCT No.: PCT/US2014/053099
§ 371 (c)(1),
(2) Date: Feb. 28, 2017

(87) PCT Pub. No.: WO2016/032477
PCT Pub. Date: Mar. 3, 2016

(65) Prior Publication Data
US 2017/0250733 A1 Aug. 31, 2017

(51) Int. Cl.
*G05F 1/10* (2006.01)
*G05F 3/02* (2006.01)
(Continued)

(52) U.S. Cl.
CPC .............. *H04B 3/54* (2013.01); *G05B 19/05* (2013.01); *G05F 1/46* (2013.01); *G08C 19/02* (2013.01);
(Continued)

(58) Field of Classification Search
CPC ......... G11C 5/147; G05F 1/465; G05F 3/205; G05F 3/262; H04B 1/1623
(Continued)

(56) References Cited

U.S. PATENT DOCUMENTS 7,454,553 B2 11/2008 Nelson et al.
7,512,521 B2 3/2009 Duren et al.
(Continued)

FOREIGN PATENT DOCUMENTS

DE 199 05 071 A1 8/2000
DE 10 2007 035 710 A1 2/2009

OTHER PUBLICATIONS

Johnson, T., "HART Communication Networks Are Improved by Small, Flexible, Low-Power Modem ICs," Analog Dialogue 46-10, Oct. 2012, Retrieved from the Internet URL: http://www.analog.com/library/analogDialogue/archives/46-10/hart modems.pdf, on Jun. 9, 2017, pp. 1-3.
(Continued)

*Primary Examiner* — Anh Q Tra
(74) *Attorney, Agent, or Firm* — Armstrong Teasdale LLP

(57) ABSTRACT

A system for coupling a modulated voltage signal onto a current loop between a host device and a field device, in various embodiments, can include a circuit and an impedance bridge. The circuit is configured to flow current from the field device between two terminals of an input circuit in the host device, wherein the two terminals are included in the current loop. The impedance bridge is positioned between the two terminals and configured to modulate impedance to convert the current in a field loop produced by the field device into terminal voltage modulation, without introducing a DC voltage burden to the current.

20 Claims, 3 Drawing Sheets

(51) Int. Cl.

| | | |
|---|---|---|
| *H04B 3/54* | (2006.01) | |
| *G08C 19/02* | (2006.01) | |
| *H04B 3/50* | (2006.01) | |
| *G05B 19/05* | (2006.01) | |
| *G05F 1/46* | (2006.01) | |
| *G08C 19/38* | (2006.01) | |
| *H04B 3/00* | (2006.01) | |
| *H04L 5/14* | (2006.01) | |
| *H04L 27/32* | (2006.01) | |

(52) U.S. Cl.
CPC ............... *G08C 19/38* (2013.01); *H04B 3/00* (2013.01); *H04B 3/50* (2013.01); *H04L 5/1423* (2013.01); *H04L 27/32* (2013.01)

(58) Field of Classification Search
USPC .......................................... 327/530, 538, 308
See application file for complete search history.

(56) References Cited

U.S. PATENT DOCUMENTS

| | | | | |
|---|---|---|---|---|
| 2008/0315855 A1* | 12/2008 | Xiao | ............ | G05F 3/30 323/313 |
| 2010/0123516 A1* | 5/2010 | Pamperin | ............ | G01R 1/28 327/543 |
| 2013/0082667 A1* | 4/2013 | Sinreich | ............ | H02J 1/10 323/234 |

OTHER PUBLICATIONS

Ko, L.T., et al., "Difference-Equation-Based Digital Frequency Synthesizer," Hindawi Publishing Corporation, Mathematical Problems in Engineering, Retrieved from the Internet URL: http://dx.doi.org/10.1155/2012/784270, on Jun. 9, 2017, vol. 2012, Article ID 784270, pp. 1-7.

Analog Devices, "Low Power HART Modem," Hart Communication Protocol, Jan. 10, 2014, Retrieved from the Internet URL: http://www.farnell.com/datasheets/1790030.pdf, on Jun. 9, 2017, pp. 1-12.

Murphy, E and Slattery, C., "Ask the Application Engineer-33 All About Direct Digital Synthesis," Analog Dialogue 38-08, Aug. 2004, Retrieved from the Internet URL: http://www.analog.com/library/analogDialoque/archives/38-08/dds.html, on Jun. 9, 2017, pp. 1-3.

International Search Report and Written Opinion issued in connection with corresponding PCT Application No. PCT/US2014/53099 dated Apr. 29, 2015.

International Search Report and Written Opinion issued in connection with related PCT Application No. PCT/US2014/53105 dated May 8, 2015.

International Preliminary Report on Patentability issued in connection with corresponding PCT Application No. PCT/US2014/53099 dated Feb. 28, 2017.

International Preliminary Report on Patentability issued in connection with related PCT Application No. PCT/US2014/53105 dated Feb. 28, 2017.

* cited by examiner

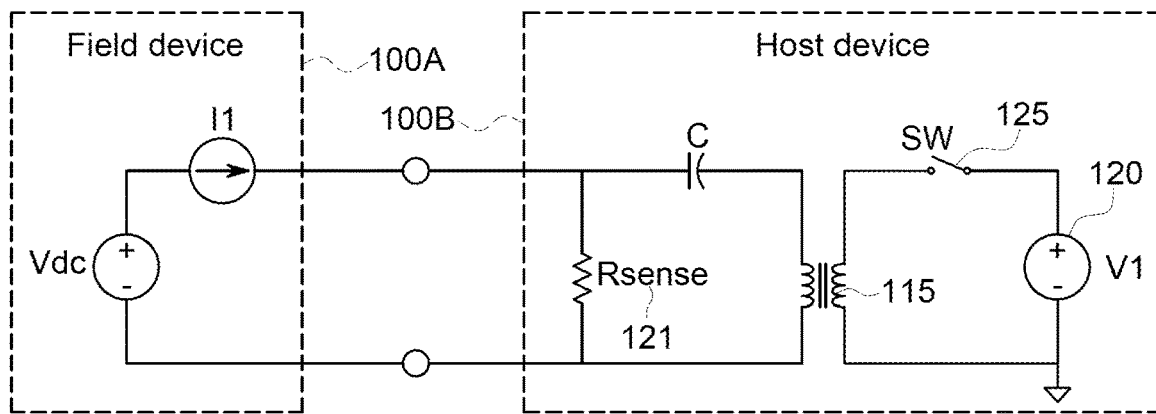
FIG. 1 (CONVENTIONAL)
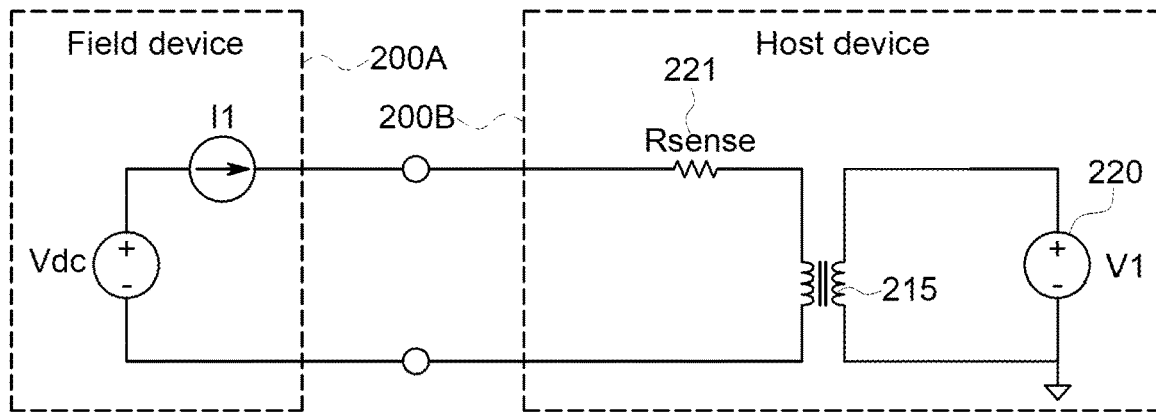
FIG. 2 (CONVENTIONAL)
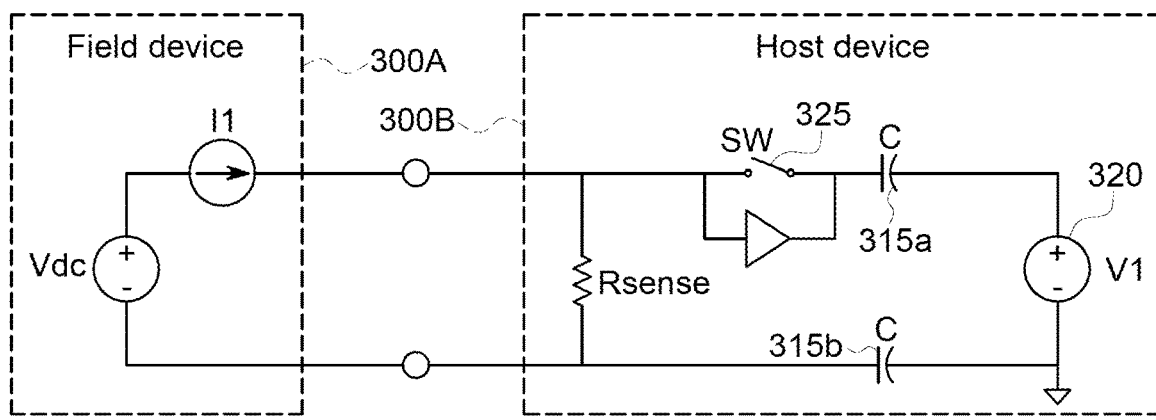
FIG. 3 (CONVENTIONAL)

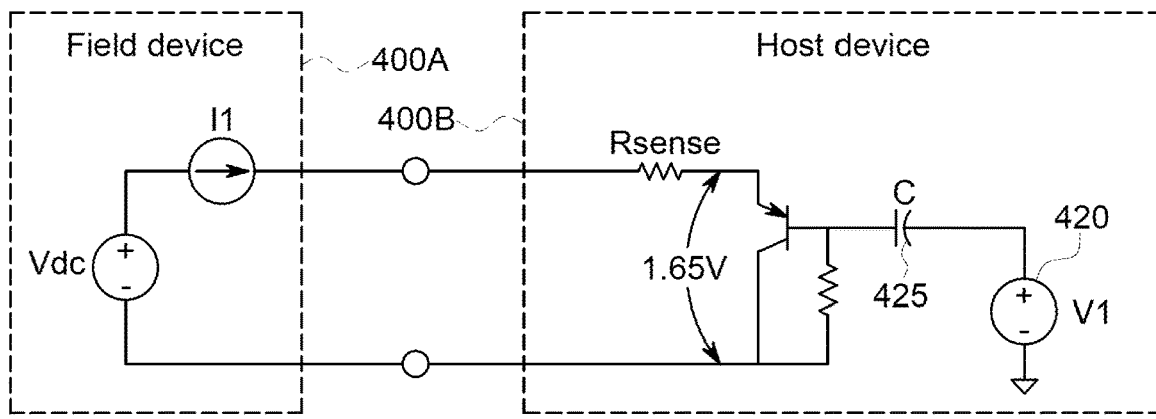
FIG. 4 (CONVENTIONAL)
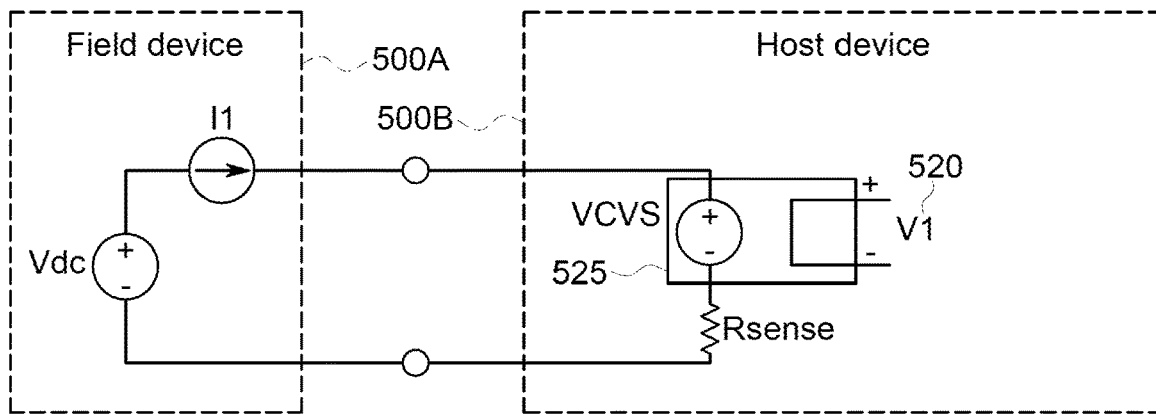
FIG. 5 (CONVENTIONAL)

METHODS, SYSTEMS, AND DEVICES FOR COUPLING A MODULATED VOLTAGE SIGNAL TO A CURRENT LOOP USING A VARIABLE IMPEDANCE BRIDGE

TECHNICAL FIELD

The present disclosure relates generally to communications. More particularly, the present disclosure relates to coupling a modulated voltage signal to a current loop for communicating with a field device.

BACKGROUND

A Highway Addressable Remote Transducer (HART) protocol is a communication protocol designed for industrial process measurement and control applications. A HART modulator is a device which produces a sine wave at one of two frequencies (1200 Hz and 2200 Hz) in such a way that changing between these two frequencies does not produce a phase discontinuity when the frequency suddenly changes. This is a basic feature of the type of modulation, Frequency Shift Keying (FSK), which is used in HART devices.

Field devices, such as a pressure meters, flow meters, and other transducers often use a 4 to 20 mA current signal to represent a measured quantity, also referred to as a process signal. The process signal normally has a low bandwidth, from DC to several Hz (29 Hz according to the HART Communication Foundation standard). The current signal flows through a current loop, and a host device measures the current signal by sensing the voltage across a resistor in the current loop. This resistor is often referred to as $R_{SENSE}$.

Smart field devices may also employ a side channel with Frequency Shift Keying (FSK) to communicate additional information to the host device. The FSK modulated signal is added to the process signal and may be demodulated in the host device. Similarly, the host device may communicate an FSK modulated signal to the field device, but the host device modulates a terminal voltage applied to the current loop. It is important that the host device not disturb the substantially DC process signal flowing from the field device through the current loop. The field device and host alternately transmit in this fashion, one using current modulation, and the other using voltage modulation.

According to the HART standard, the low impedance device (current input) needs to have an impedance of 230 to 600 Ohms, and the impedance should remain flat to within 3 dB in the extended frequency band. Safety systems and other practices have determined a maximum allowable DC burden for a low impedance device. Typically, the conventional maximum may be 5 volts based upon a conventional 250 Ohm burden (or load) and 20 mAmp current signal. This load resistance has to be taken into account when coupling terminal voltage into the current loop by the host device.

Currently, there are several techniques for coupling a terminal voltage signal from a host device into a low impedance network, such as a current loop, using AC coupling or DC coupling. AC coupling techniques employ a transformer in parallel, a transformer in series, or capacitor coupling. DC coupling techniques employ a transistor or a voltage controlled voltage source.

Referring to FIG. 1, for example, one technique for AC coupling uses a transformer 115 coupled in parallel to the load resistor 121 in the host device 100B. The transformer 115 couples an output signal V1. According to this technique, the host device 100B must include a switch 125 to disconnect the shunt impedance while not transmitting FSK modulated signals to the field device 100A. Without the switch 125, the impedance of the voltage source 120 reflected through the transformer 115 would shunt the 250 Ohm load resistance. As noted above, the HART standard requires the load impedance to be no less than 230 Ohms. The modal behavior introduced by the switch 125 is a source of undesirable discontinuities and voltage transients. In addition, a transformer is physically large relative to the rest of the host device I/O circuitry. The size and cost of the transformer make the use of transformer coupling undesirable.

FIG. 2 illustrates another technique for AC coupling, using a transformer 215 in series with the load resistor 221 in the host device 200B. In FIG. 2, the current flows from the field device 200A to the host device 200B. The host device 200B employs a voltage source 220. Similar to the approach shown in FIG. 1, this technique is not desirable due to the size and cost of the transformer 215.

FIG. 3 illustrates another technique for AC coupling, using capacitors 315a and 315b to inject signal V1 320 from the host device 300B. The capacitive coupling used in this technique causes an undesirable voltage transient upon connection to the current loop. The transient occurs each time the host device 300B transmits to the field device 300A. Also, the current loop is not allowed to have a low impedance while the field device 300A is transmitting. Therefore, this approach requires a switch 325 to isolate the capacitors 315a and 315b and the voltage source 320.

FIG. 4 illustrates a technique for DC coupling in which a transistor buffer is used in the host device 400B. In FIG. 4, the current flows from the field device 400A to the host device 400B. A large value capacitor 425 is also connected in series with the voltage source 420 in the host device 400B. The capacitive coupling in this arrangement creates an AC ground path from the field wiring into the host device 400B, thus causing an undesirable current loop from field wiring from passing into the host device.

FIG. 5 illustrates another technique for DC coupling in which a voltage controlled voltage source buffer 525 is used in the host device 500B. In FIG. 5, the current flows from the field device 500A to the host device 500B. The host device 500B employs a voltage source 520. The voltage controlled voltage source buffer 525 adds to the voltage burden of the resistor $R_{SENSE}$, resulting in an undesirable high voltage burden.

SUMMARY

In at least one embodiment, the present disclosure provides a system for coupling a modulated voltage signal onto a current loop between a host device and a field device. The system can include a circuit and an impedance bridge. The circuit is configured to flow current from the field device between two terminals of an input circuit, wherein the two terminals are included in the current loop in the host device. The impedance bridge is positioned between the two terminals and configured to modulate impedance to convert the current in a field loop produced by the field device into terminal voltage modulation, without introducing a DC voltage burden to the current.

In at least another embodiment, the present disclosure provides a method for coupling a modulated voltage signal onto a current loop between a host device and a field device, comprising: flowing current from the field device between two terminals of an input circuit, wherein the two terminals are included in the current loop in the host device; and modulating impedance to convert loop current into terminal voltage modulation, without introducing a DC voltage burden to the current.

Further features and advantages, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant arts) based on the teachings contained herein.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various figures. The drawings are only for purposes of illustrating preferred embodiments and are not to be construed as limiting the disclosure. Given the following enabling description of the drawings, the novel aspects of the present disclosure should become evident to a person of ordinary skill in the art.

FIG. 1 illustrates a conventional arrangement for coupling a host device and a field device using a transformer coupled in parallel with a load resistor of the host device;

FIG. 2 illustrates another conventional arrangement for coupling a host device and a field device using a transformer coupled in series with a load resistor of the host device.

FIG. 3 illustrates another conventional arrangement for coupling a host device and a field device using AC coupling capacitors coupled in parallel with a load resistor of the host device.

FIG. 4 illustrates another conventional arrangement for coupling a host device and a field device using a series transistor buffer in conjunction with a capacitor.

FIG. 5 illustrates another conventional arrangement for coupling a host device and a field device using a voltage controlled voltage source buffer coupled in series with a load resistor of the host device.

DETAILED DESCRIPTION

While illustrative embodiments are described herein for particular applications, it should be understood that the disclosure is not limited thereto. Those skilled in the art with access to the teachings provided herein will recognize additional modifications, applications, and embodiments within the scope thereof and additional fields in which the design and technique described herein would be of significant utility.

Figure 6:
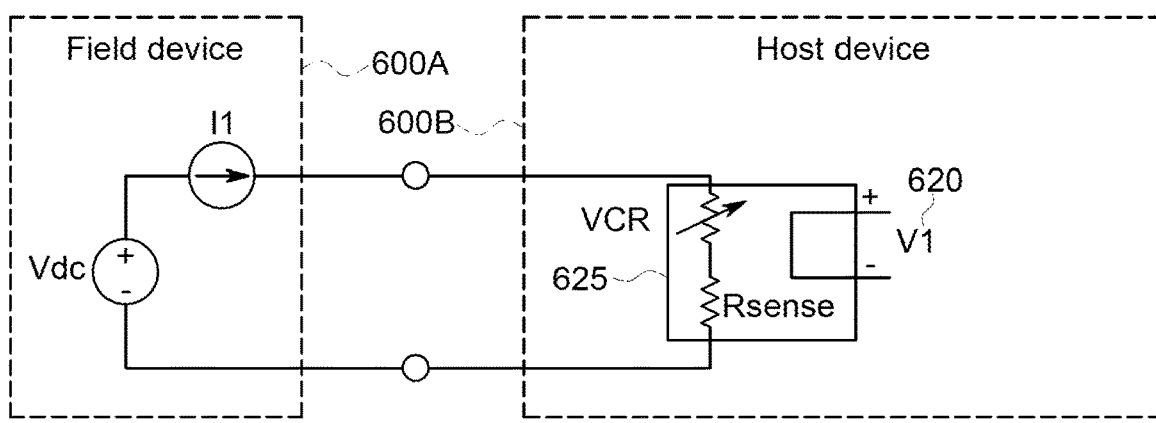
FIG. 6 illustrates an arrangement for coupling a host device and a field device using a variable impedance bridge according to an illustrative embodiment.

FIG. 6 illustrates an arrangement for coupling a modulated voltage signal to a current loop using a variable impedance bridge according to an illustrative embodiment. According to this embodiment, an impedance bridge with variable impedance, (represented in FIG. 6 as a voltage controlled resistor (VCR) 625) is used in order to couple a modulated terminal voltage from the voltage source 620 of the host device 600B into the current loop with a variable impedance, The bridge's output impedance is variable so that it may modulate the loop voltage by working against the loop current produced by the field device 600A. The bridge input impedance looking into the V1 terminals may be moderately high to prevent current paths or ground loops from field device wiring passing into the host device.

Although not shown in FIG. 6 in the interest of simplicity of illustration, those skilled in the art would understand and appreciate how the terminal voltage from the voltage source 620 may be modulated with a sinusoidal signal using, e.g., a HART modulator. According to illustrative embodiments, the modulated voltage signal is then coupled to the current loop via the variable impedance bridge for transmission to the field device.

Figure 7:
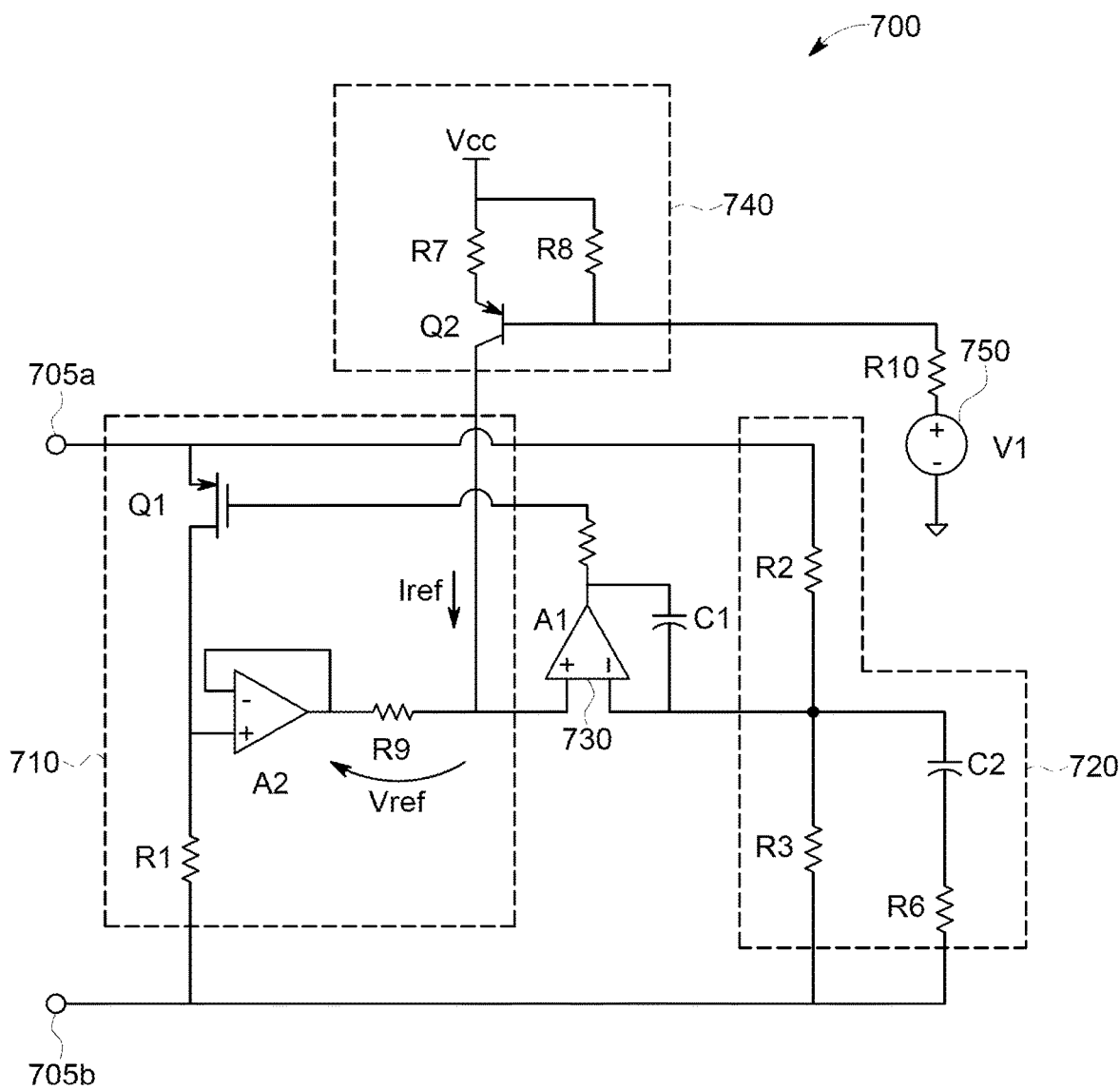
FIG. 7 illustrates in detail an example of a variable impedance bridge which may be used in the arrangement of FIG. 6 according to an illustrative embodiment.

FIG. 7 illustrates a detailed implementation of an impedance bridge which may be used in the arrangement shown in FIG. 6 according to an illustrative embodiment. According to this embodiment, the impedance bridge is composed of two vertical legs represented in FIG. 7 as left leg 710 and right leg 720. The impedance bridge also includes an error amplifier 730 connecting the middles of the legs and a current source 740 controlled by the V1 reference voltage source 750 of the host device 700.

The left leg 710 has a low impedance, composed of R1 and a Q1 FET. According to an illustrative embodiment, the Q1 FET operates in triode (or linear) mode. Resistor R1 is used to set the DC resistance and may dual as the $R_{SENSE}$ element. $R_{SENSE}$ may optionally be implemented outside of the impedance bridge, connected in series with the impedance bridge in the current loop.

The right leg 720 has a higher impedance by a few orders of magnitude, compared to the left leg 710. The right leg 720 is composed of resistance provided by resistors R2, R3, and R6 and capacitance provided by a capacitor C2.

According to an illustrative embodiment, the impedance bridge has variable impedance looking into the terminals 705a and 705b from a field device (not shown). R3. The impedance at DC is resistive and set by values R1, R2, R3. The impedance in the HART band can be a different value that is set by the values of R1, R2, R3 and also C2 and R6, which appear in parallel with R3. In addition, a current source is provided for decoupling the voltage source signal from the current loop. The current source varies the impedance in the HART band. The variation (signal) in impedance works against the DC field loop current to convert impedance modulation into terminal voltage modulation. Also, switchless, non-modal operation is provided. This is described in further detail below.

Referring again to FIG. 7, the current from the field device received via the input terminal 705a, which is from 4 mA to 20 mA, flows through the two legs 710 and 720 and returns to the field device via the output terminal 705b. A HART frequency reference current Iref flows from the current signal source 740 and returns to the source common via an operational amplifier A2. The current source 740 ensures that the voltage signal source 750 of the host device 700 is decoupled from the voltage domain of the current loop.

The error amplifier A1 controls the Q1 FET resistance to maintain the ratio Q1:R1 equal to R2:R3. Thus, the resistance at DC looking into the terminals 705a and 705b is:

$$R(dc) = R1 * \frac{R2 + R3}{R3}$$

According to an illustrative embodiment, the variable impedance from DC to HART is controlled by capacitors C1 and C2 and the resistor values. In the frequencies of interest, where C2 becomes an AC short, R3 and R6 combine in parallel and the input resistance becomes:

$$R(hart) = R1 * \frac{R2 + Rth}{Rth}$$

where Rth=R3 II R6.

The impedance of the bridge has two important qualities: lower DC burden in the field loop but higher impedance in the FSK band. The lower DC burden requires less compliance voltage from the field device, The host device is a current input device. The host device consumes 5 volts or less, in order not to exceed the conventional maximum of 5 volts of burden. As explained above, in the FSK band, the impedance is required to be a minimum of 230 Ohms to meet HART requirements.

The upper and lower frequencies (FSK bandwidth) can be controlled independently by C1 and C2. These values may be selected to provide a relatively flat characteristic in the band of interest. Impedance flatness in the extended frequency band is a requirement of the HART specification.

For buffering the DC reference voltage produced by the voltage source 750 from the current loop, the signal reference voltage V1 is converted to a current source by FET Q2. The current provides the important feature of decoupling the current loop's voltage domain from the host device voltage reference 750. The current is converted back into a voltage by the operational amplifier A2 and the resistor R9. This voltage is summed into the terminal voltage by the error amplifier A1, controlling the resistance of Q1 FET. None of the signal current enters the field loop. Instead, it returns through A2 to the signal generator V1's power supply.

To achieve non-modal operation, the FSK reference, that is the AC portion of V1, is "parked", but the DC portion of V1, or bias current, is turned on at all times. When the host device 700 needs to begin FSK transmission, it simply adds the AC component into the ever-present DC component. (By eliminating DC switching, no transient is introduced.)

It should be appreciated that the arrangement and selection of components in the impedance bridge shown in FIG. 7 is not restricted and that an impedance bridge may include different components to achieve the same effect. For example, instead of FETs, other types of transistor may be used. Also, an opto-coupler may be used in place of the current source transistor Q2. The opto-coupler circuit may require fewer operational amplifiers. However, using an opto-coupler, the current transfer ratio may not be as well-controlled or may have greater variation than the arrangement shown in FIG. 7.

It should be appreciated that the impedance bridge may also be used for other purposes. The bridge effectively copies the voltage across R2 to Q1. R2 and R3 can be replaced by capacitors or any other circuit elements with impedances Z2 and Z3, and the bridge may attempt to duplicate the voltage ratio of Z2:Z3 into the Q1:R1 leg. For example, a large-value capacitor could be emulated in the left leg from a small-value capacitor in the right leg. As an alternative, a voltage reference with limited current capacity could be copied into a voltage source with higher current capacity.

According to illustrative embodiments, coupling a modulated voltage signal to a current loop using a variable impedance bridge avoids the cost and size of the traditional transformer approach. It also avoids the voltage transient that is caused by switch closure or opening when using capacitive coupling or transformer coupling. In addition, according to illustrative embodiments, linear and switchless (non-modal) operation is achieved.

Further advantages of the impedance bridge coupling arrangement described above include reductions size, cost, and complexity of coupling of modulated voltage signals to field current loops. This reduction in size makes it possible to realize a smaller footprint on an I/O circuit board. Also, there is no compromise required between low impedance and small transients during modulator modem turn-on.

According to illustrative embodiments, the impedance bridge may be implemented with discrete components or in application specific ICs, unlike transformers and large value capacitors of conventional approaches.

Figure 8:
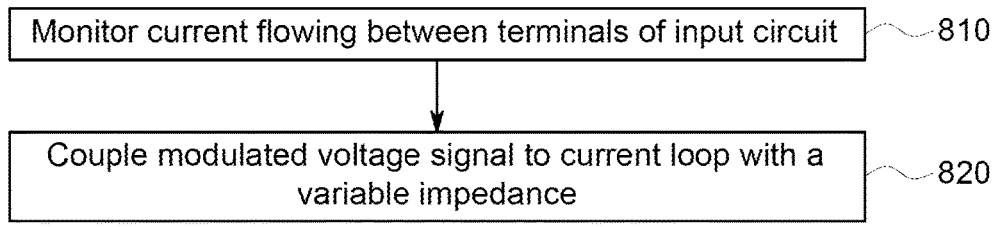
FIG. 8 illustrates a method for coupling a modulated voltage signal onto a current loop between a host device and a field device according to an illustrative embodiment.

FIG. 8 illustrates a method according to an illustrative embodiment. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time.

Referring to FIG. 8, the method 800 begins with flowing a current flowing from a field device across terminals of a host device, e.g., between terminals 705*a* and 705*b* of the host device 700, at step 810. At step 820, a modulated voltage signal supplied by the host device 700 is coupled to the current loop via an impedance bridge, such as that shown in FIG. 7, such that an impedance presented to the current loop by the host device 700 varies with the coupling of the modulated voltage signal by working against the current in the field loop produced by the field device to convert impedance modulation into terminal voltage modulation, without introducing a voltage burden to the current.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

What we claim is:

1. A method for coupling a modulated voltage signal onto a current loop between a host device and a field device, comprising:

flowing current from the field device between two terminals of an input circuit of the host device, wherein the two terminals are included in the current loop;

modulating a voltage signal provided at a voltage signal source of the host device; and modulating impedance using an impedance bridge to convert loop current into terminal voltage modulation, without introducing a DC voltage burden to the current, the impedance bridge including a first leg and a second leg, wherein the first leg has a higher impedance than the second leg, the impedance bridge having a variable output impedance that is controlled by the voltage signal source of the host device.

2. The method of claim 1, wherein modulating the impedance comprises modulating the impedance, without capacitive coupling.

3. The method of claim 1, wherein modulating the impedance comprises modulating the impedance, without transformer coupling.

4. The method of claim 1, further comprising providing isolation or decoupling to prevent the current from field device wiring from passing into the host device.

5. The method of claim 1, wherein modulating the impedance comprises modulating the impedance in proportion to modulating the voltage signal.

6. The method of claim 1, wherein modulating the impedance comprises maintaining the impedance at a constant level when the voltage signal is not modulated.

7. The method of claim 1, wherein modulating the impedance comprises assigning different values or equal values to the impedance at the current and Highway Addressable Remote Transducer (HART) frequency band.

8. The method of claim 1, wherein the modulated voltage signal includes AC signals within a specific frequency band, and the current flowing between the two terminals includes DC signals.

9. The method of claim 8, wherein the specific frequency band is a Highway Addressable Remote Transducer (HART) frequency band.

10. The method of claim 1, further comprising decoupling a Highway Addressable Remote Transducer (HART) reference signal from the current loop.

11. The method of claim 1, wherein the field loop is defined as the loop seen looking into the two terminals.

12. A system for coupling a modulated voltage signal onto a current loop between a host device and a field device, comprising:
    a circuit configured to flow current from the field device between two terminals of an input circuit of the host device, wherein the two terminals are included in the current loop;
    a voltage signal source configured to provide the modulated voltage signal; and
    an impedance bridge including a first leg and a second leg, wherein the first leg has a higher impedance than the second leg, the impedance bridge having a variable output impedance that is controlled by the voltage signal source, the impedance bridge is between the two terminals and is configured to modulate impedance to convert the current in a field loop produced by the field device into terminal voltage modulation, without introducing a DC voltage burden to the current.

13. The system of claim 12, wherein the impedance of the impedance bridge varies in proportion to the modulated voltage signal when the voltage signal is modulated.

14. The system of claim 12, wherein the impedance of the impedance bridge is maintained at a constant level when the modulated voltage signal is not modulating.

15. The system of claim 12, wherein the impedance of the impedance bridge is assigned different values or equal values at the current and Highway Addressable Remote Transducer (HART) frequency band.

16. The system of claim 12, wherein the modulated voltage signal includes AC signals within a specific frequency band, and the current flowing between the two terminals includes DC signals.

17. The system of claim 16, wherein the specific frequency band is a Highway Addressable Remote Transducer (HART) frequency band.

18. The system of claim 12, further comprising a buffer configured to decouple a Highway Addressable Remote Transducer (HART) reference signal from the current loop.

19. The system of claim 12, wherein the impedance bridge is configured to provide isolation or decoupling to prevent the current from field device wiring from passing into the host device.

20. An electronic device for coupling a modulated voltage signal from a host device to a current loop between the host device and a field device, comprising:
    a resistor included in the current loop and configured to form a voltage across its terminals in relation to a current flowing from the field device through the current loop; and
    an impedance bridge included in the current loop, the impedance bridge including a first leg and a second leg, wherein the first leg has a higher impedance than the second leg, the impedance bridge having a variable output impedance that is controlled by the modulated voltage signal, the impedance bridge is configured to modulate the impedance to convert the current in a field loop produced by the field device into terminal voltage modulation, without introducing a DC voltage burden to the current.

* * * * *